United States Patent [19]
Vermeulen et al.

[11] Patent Number: 5,158,641
[45] Date of Patent: Oct. 27, 1992

[54] HEAT-LAMINATING APPARATUS

[75] Inventors: Leon L. Vermeulen, Herenthout; Robert S. Pauwels, Brasschaat; Karel L. De Clerck, Bornem, all of Belgium

[73] Assignee: AGFA-Gevaert N.V., Mortsel, Belgium

[21] Appl. No.: 694,481

[22] Filed: May 2, 1991

[30] Foreign Application Priority Data

May 11, 1990 [EP] European Pat. Off. ........ 90201225

[51] Int. Cl.⁵ ............................................. B32B 31/04
[52] U.S. Cl. .................... 156/555; 156/583.1; 100/93 P
[58] Field of Search ............. 156/555, 324, 583.1, 156/583.9; 100/93 P, 232

[56] References Cited

U.S. PATENT DOCUMENTS 2,906,847  9/1959  Grevich ..................... 156/555 X
3,453,950  7/1969  Pfeiffer .................... 100/93 P
4,311,550  1/1982  Kerttula ................... 156/555
4,353,776 10/1982  Giulie et al. ............. 156/583.3 X Primary Examiner—David A. Simmons
Assistant Examiner—J. Sells
Attorney, Agent, or Firm—William J. Daniel

[57] ABSTRACT

A sandwich of sheet material and a plastic film on at least one side thereof is laminated together by advancing the sandwich in one direction between an opposed pair of rigid heating and pressure plates having mutually facing planar surfaces for contacting the sides of the sandwich. The plates of the pair being biased together under a pressure which increases in the direction of the sandwich advance while the pressure level across the plates transverse to the direction of advance at any locus along the plates is substantially uniform, and passing the thus heated and compressed sandwich between the nip of a pair of pressure rollers to complete welding of the sandwich together.

5 Claims, 3 Drawing Sheets

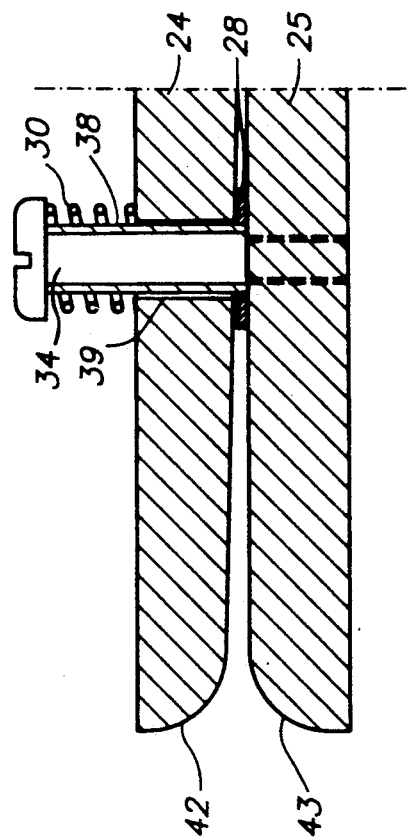
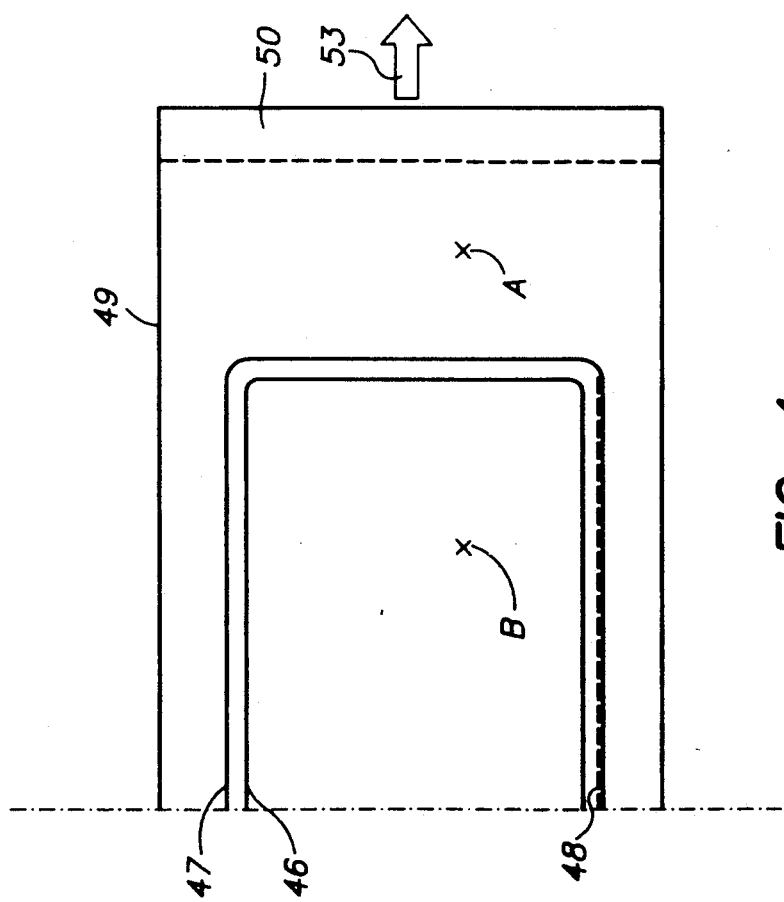
FIG. 3
FIG. 4

HEAT-LAMINATING APPARATUS

BACKGROUND OF THE INVENTION

1. Field of the Invention

The present invention relates to an apparatus for tightly covering the surface of a sheet, such as a label or identification document, with a thermoplastic film by heat-laminating the film to the document.

2. Description of the Prior Art

Identification documents essentially comprise a card or sheet material containing information relating to the bearer. Generally, a portion of the information is in the form of a photograph. Identification cards (I.D. cards) are used e.g. to establish a person's authorization to conduct certain activities (driver's licence) or the authorization to have access to certain areas (employee I.D. cards) or to engage in credit transactions (I.D. credit cards).

In view of the widespread use of I.D. cards, especially in commercial transactions, such as cashing checks, credit purchases, etc., it is important that the information contained in the I.D. card is protected against mechanical and/or chemical damage and that the I.D. card gives maximum protection against counterfeiting.

Normally the information in the I.D. card is protected by lamination between plastic sheets serving as support and covering sheet.

Many attempts have been made to obtain a seal that is so strong that it resists separation, e.g. by razor blade and/or wet treatment. The use of a pouch structure wherein only the border parts of the plastic sheets are sealed is not sufficiently tamperproof since after cutting around the edge of the original card the pouch can be opened and some information such as the photograph can be removed and replaced by other information before resealing the pouch.

Ideally, to avoid said shortcoming a "security seal" is established between the information-bearing element of the card or document and the plastic. As described in U.S. Pat. No. 4,151,666 the security seal ensures that if one should succeed in the removal of the plastic cover sheet also a substantial portion of the information containing part of the document will also be removed so that a visibly damaged part remains adhering to the support. In this way a protection against mere substitution of information is obtained discouraging alteration of sealed documents.

According to an embodiment described in said U.S. Pat. No. 4,151,666 a tamperproof identification document is made by lamination of transfer prints in envelopes of the type shown in its FIGS. 4 and 5. Each of the envelopes of said Figures has an adhesive system capable of providing a "security seal". The exemplified transfer prints are actually silver complex diffusion transfer photographs which usually contain a portrait of the bearer together with photographic information relating to her or him. Diffusion transfer photographs are extensively used in I.D. card issuance systems known as "instant issuance" systems. In such systems, the intended bearer of the I.D. card is photographed in a card issuance station where appropriate photographic and lamination materials are assembled with a proper lamination equipment.

According to a more recent method described e.g. in U.S. Pat. No. 4,738,949 and published European Patent Application 0 283 048 the "identity information" is reproduced by thermal printing wherein the image is formed by a thermally transferred dye. Thermal dye transfer proceeds according to one common technique by so-called dye sublimation in which a dye layer containing sublimable dyes having heat transferability is brought into contact with a receiver sheet and selectively, in accordance with a pattern information signal, applied by a thermal printing head or modulated laser beam, is transferred to a receiver sheet and forms a pattern thereon, the shape and density of which is in accordance with the pattern and intensity of the heat applied to the dye-donor element. The thermal transfer prints, e.g. colour photographs obtain their information e.g. by means of a colour video camera yielding electronic signals that modulate the heating of said thermal printing head or laser beam.

Many of the known methods for producing I.D. cards involve the use of heat-activatable adhesive systems. According to a very convenient embodiment the heat-activatable adhesive system makes part of a pouch or similar assembly structure wherein it is present as an inner layer applied respectively to a support and cover sheet member that are pre-affixed to each other at one edge. The I.D. information sheet, which contains for example a portrait of the intended bearer, is inserted between the inner adhesive layers of the pouch and the lamination is carried out in a platen press, roll laminator or the like to provide an effective security seal for the final product.

The heat-activatable adhesive system is adapted according to the type of I.D. information sheet to be laminated. For example, as described in U.S. Pat. No. 4,101,701 an I.D. card laminar structure includes a transparent polyester front sheet the inner surface of which is provided with a first layer of a heat-activatable adhesive comprising an ethylene acrylic acid copolymer or an ethylene ethyl acrylate copolymer or mixtures of both and a second layer comprising a mixture having a ratio of about 2/1 of polyvinyl alcohol and poly-4-vinylpyridine such for laminating thereto a dye diffusion transfer photograph wherein the image is formed through silver halide photography in a hydrophilic colloid layer comprising a mixture of polyvinyl alcohol and poly-4-vinylpyridine.

In the production of laminates having a hydrophobic information carrier as is the case e.g. with I.D. information sheets wherein the information is printed by thermal dye transfer the image-receiving layer includes as described e.g. in U.S. Pat. No. 4,507,349 polymers selected from the groups of a polycarbonate, polyurethane, polyester, polyamide, polyvinyl chloride, acrylonitrile block copolymer, cellulose triacetate, acrylamide, polyacrylonitrile-co-butadiene-styrene (ABS), and mixtures thereof.

An adhesive resin material that may serve in lamination for firmly bonding the thermal dye transfer image receiving layer to a transparent scratch resistant plastic cover sheet such as a polyethylene terephthalate sheet, is e.g. a polyethylene or atactic polypropylene.

When using an adhesive layer made of such low softening point polymer in combination with an image-receiving layer containing a pattern of sublimable dye heat lamination will give rise to bleeding, i.e. line spreading, of the transferred dye which makes said polymers less suited for use in the production of laminates including sublimable dyes. On the other hand low softening point polyethylene adhesive layers are plasticized in the heat lamination step for a sufficiently long time to allow the escape of trapped air while joining the members to be laminated and thereby artefacts of included air and local wrinkling of the adhesive layer are avoided.

The problem of bleeding has been resolved by the use of adhesive layers that have a higher softening temperature and that flow less than polyethylene, e.g. layers consisting of co-polyesters.

These layers, however, require the use of higher pressures and higher temperatures in order to obtain a satisfactory sealing.

We have found that common heat-laminating apparatus that comprise a pair of inlet rollers, a pair of outlet rollers and two springbiased pressure plates between the rollerpairs that exert a uniform pressure on the sandwich transported between them, unsufficiently evacuate air that is present between the image of the sheet and the sealing film so that a plurality of isolated minuscule opaque islands may be created that make the image worthless.

Attempts to improve the operation of these apparatus by increasing the bias on the pressure plates have failed since it has been shown that the transport of the sandwich between the plates occurs shockwise or becomes even impossible.

Thus, laminating apparatus of a type as disclosed in JP UM 53-30531 are not suited for the sealing of laminates by means of adhesive layers having a higher softening temperature.

SUMMARY OF THE INVENTION

Object of the Invention

It is the object of the invention to provide a heat-laminating apparatus which avoids the formation of the artifacts associated with the use of less soft adhesive layers, as mentioned hereinbefore.

STATEMENT OF THE INVENTION

Apparatus for heat-laminating a sheet with a plastic film which comprises a pair of inlet rollers forming a nip for conveying a sheet which has at least one surface overlaid by a plastic film into the apparatus, a pair of plates downstream of the nip of the inlet rollers between which the sheet/film sandwich is advanced by the inlet rollers, means for biasing the plates towards each other to keep them in contact with the sheet-film sandwich, means for heating at least that plate that is in contact with the plastic film, a pair of outlet rollers forming a nip for welding by pressure the heated plastic film to the surface of the sheet and for withdrawing the laminated sheet from the apparatus, and means for driving said pairs of rollers, is characterised in that the biasing means are arranged in such a way that the pressure on the sheet/film sandwich is larger at the outlet end of the plates than at their entry end.

It has been shown that the inventive feature operates very efficiently for avoiding the artefacts mentioned hereinbefore.

It is believed that the improved operation results from the increasing pressure on the sheet/film sandwich during its advance between the plates, which has for effect that air that is entrapped between the sheet and the plastics film is smoothly and progressively squeezed out, this in spite of the weakening of the surface of the plastics film that contacts the sheet, and the resultant sticking of the film to the sheet, that starts already before the sheet/film sandwich reaches the outlet end of the plates.

The use of a uniform, but higher than usual, pressure over the overall length of the sheet path between the plates would render the apparatus inoperative because it would become difficult to advance the sheet/film sandwich between the plates by the inlet roller pair, without causing wrinkling or buckling of the sandwich.

Apparatus corresponding to the introductory portion of the above statement are well known in the art. They operate with a plate pressure that is uniform along the path of the sheet/film sandwich between the plates. It will be understood that suchlike apparatus are easy to modify to operate in accordance with the present invention whereby their use may be extended to sheet/film combinations that are more difficult to seal.

According to one suitable embodiment of the invention, the plates are springbiased towards each other by first spring means at their entry end and second spring means at their outlet end, the bias of the second spring means exceeding that of the first spring means.

According to an other suitable embodiment of the invention, the plates are springbiased towards each other by spring means that are located closer to the outlet end of the plates than to their inlet end.

According to a suitable embodiment of the invention, spacer means is provided between the plates at their entry end so that a wedge-like gap configuration is obtained between the plates which decreases towards zero, or to a value smaller than the inlet opening, at the outlet end of the plates. The gap width thus formed at the inlet end of the plates may be larger than the thickness of the sheet/film sandwich to be laminated.

According to another suitable embodiment of the invention, spacer means is provided between the plates for maintaining an outlet gap between the plates which is larger than the thickness of a leader which may be used for feeding the sheet/film sandwich through the apparatus, but smaller than the combined thickness of the sandwich and the leader.

The use of a leader is imperative in those instances in which the length of the sheet/film sandwich is smaller than the distance between the inlet and outlet rollers of the laminating apparatus. Usually, a leader consists of a folded paper wrapper or the like, the innerside surfaces of which are siliconized to prevent adhesion to molten adhesive that may soil the edges of a just sealed sheet/film sandwich.

BRIEF DESCRIPTION OF THE DRAWINGS

The apparatus according to the present invention will be described hereinafter by way of example with reference to the accompanying drawings wherein:

FIG. 3 is an enlarged longitudinal sectional view of the heating plates according to line 3—3 of FIG. 2, FIG. 4 illustrates the relative position of the different elements in a leader.

DETAILED DESCRIPTION OF THE INVENTION

Figure 1:
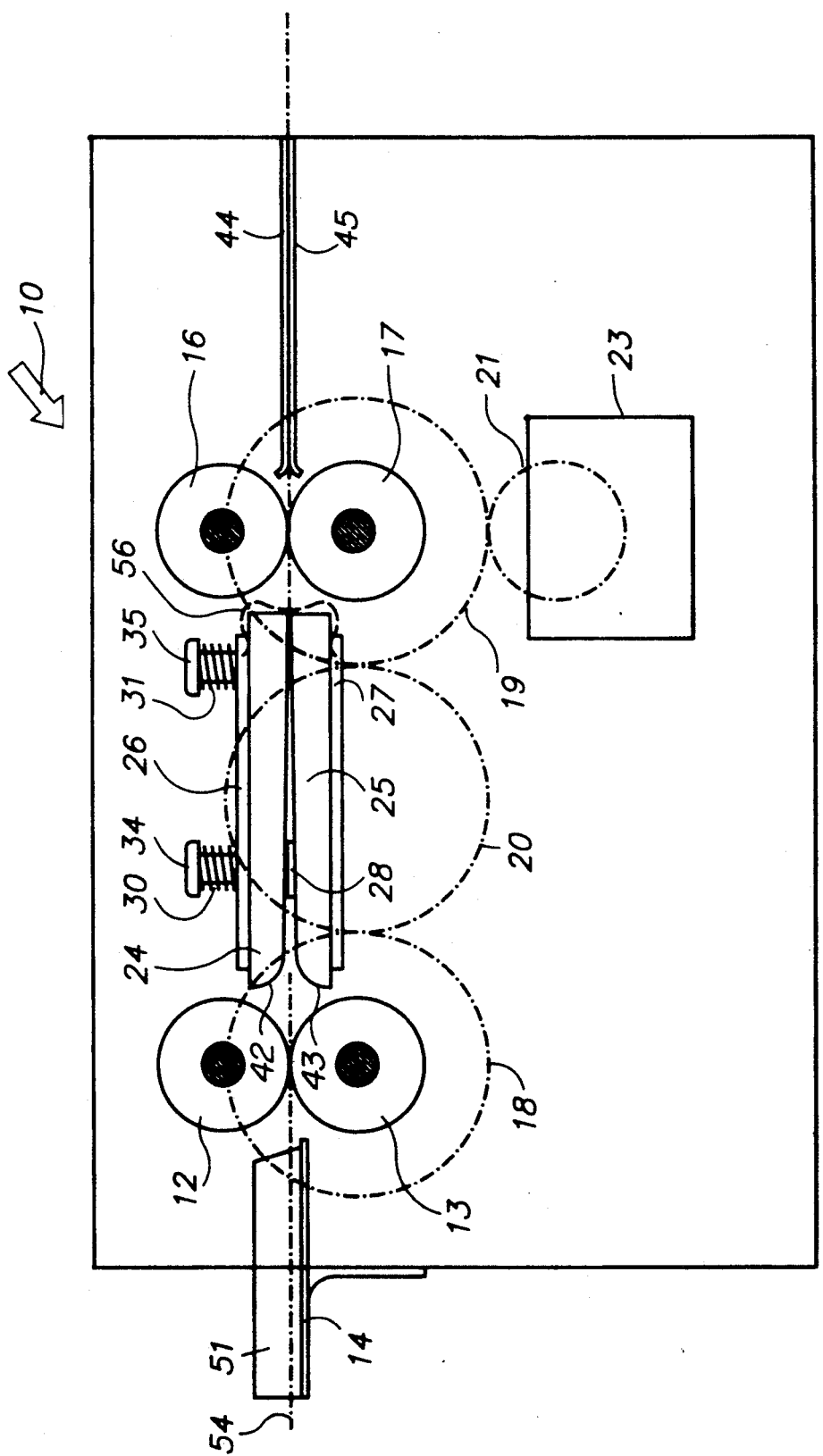
FIG. 1 is a diagrammatic longitudinal sectional view of one embodiment of an apparatus according to the invention.

Referring to FIG. 1 which illustrates diagrammatically a longitudinal sectional view of one embodiment of an apparatus according to the invention, the apparatus 10 is mounted within a generally rectangular housing 11 which may comprise a metal frame structure for supporting the different driving members and the heating plates, and a metal or plastics cover for covering the frame structure.

The apparatus has a pair of inlet rollers 12, 13 which form a nip for conveying a sheet/film sandwich which is advanced by the operator over an inlet platform 14, into the apparatus, and a pair of outlet rollers 16, 17 for welding the film(s) to the sheet and for withdrawing the laminated product from the apparatus.

The rollers of each roller pair are springbiased towards each other to obtain the proper pressure force on the sheet and the film(s). Each roller pair has at one end intermeshing gears (only the upper gears 58, 59 being illustrated in FIG. 2) and the lower roller of each pair of rollers has at the opposite end a gear such as the gears 18 and 19 represented in broken lines which are interconnected by a central gear 20. The gear 19 is in engagement with the output gear 21 of an electric motor 23.

Between the inlet and outlet rollers there are provided two opposed heating plates 24, 25 which bear at their backside resistive heating elements 26, 27. The plates may in a suitable embodiment be formed by rectangular plates of a good heat-conductive material such as aluminum or copper. The faces of the plates that form the heating gap are flat or planar. The heating elements are electrically insulated flat members that may cover a substantial portion of the back surface of the plates, and that may be bonded thereto by a heat-resistant glue.

The lower heating plate 25 is mounted stationary in the apparatus whereas the upper plate 24 is springbiased towards the lower one and kept separated therefrom by spacers 28 and 29 in the form of usual washers.

The spacers have been illustrated in broken lines in FIG. 1 and are formed by conventional washers. The spacer 28 is clearly recognizable in the enlarged sectional view of FIG. 3.

The effect of the spacers on the plates is that a wedge-like gap is formed between the plates, the gap width being maximum at the entry end of the plates and zero at the outlet end.

The spring-biasing of the upper heating plate 24 occurs by four helical springs, 30, 31, 32 and 33, that are fitted between the heads of screws 34 to 37 and the upper heating plate 24. The screws fit in corresponding screw threaded bores of the lower heating plate 25 and take a correct axial position by sleeves that are clamped between their heads and the base plate 25.

The upper heating plate has correspondingly widened bores so that the sleeves form vertical guides for the plate.

This is illustrated in detail for the screw 34 in FIG. 3, where a sleeve 38 is clamped between the head of the screw and the heating plate 25, and a bore 39 in the heating plate enables free vertical movement of the plate along the sleeve 38. The helical compression spring 30 is clamped between the head of the screw and the upper surface of the heating plate 24.

Figure 2:
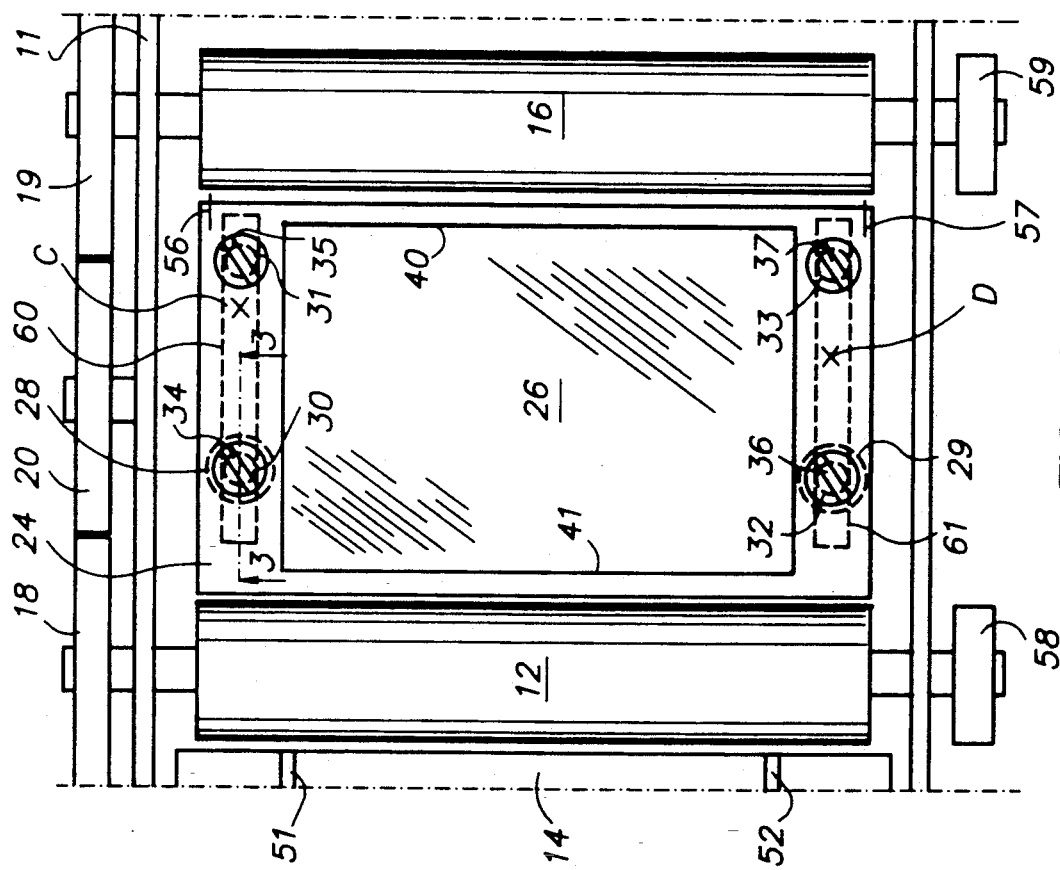
FIG. 2 is a partial top plan view of the apparatus according to FIG. 1.

The spring-biasing of the upper heating plate 24 towards the lower plate 25 is such that the biasing force at the outlet end 40 of the plates is larger than at the inlet end 41 in FIG. 2. This has been obtained in the present embodiment by the location of the springs in such a way that the springs 31 and 33 are closer to the outlet end than are the springs 30 and 32 to the inlet end 41. Further, the springs 31 and 33 are stronger than the springs 30 and 32.

The heating plates finally have a widened inlet opening which is formed by rounded edges 42 and 43.

The laminated product is received between two pressure plates 44 and 45, see FIG. 1, which maintain pressure on the just sealed product for some seconds, and which also cool the product before it leaves the apparatus.

The sheet assembly which has been introduced into the described laminating apparatus for producing the laminated product is illustrated in FIG. 4. All the elements have been drawn as completely transparent in order to simplify the understanding of the drawing. A sheet document 46 which may bear photographic and other information relating to the bearer, is placed by the operator in an assembly envelope designated as 47 which comprises a front plastic sheet member coupled to a back plastic sheet member along an edge 48 illustrated in a broken line. Both sheet members bear at their inner faces a heat-sealable layer. The thus prepared assembly is placed about centrally in a leader 49, which is in fact an envelope comprising two coincident paper strips which are sealed together at the front edge 50.

The operator then takes the leader while keeping the enclosed assembly in place by means of his thumb and forefinger, and advances it with the front edge 50 in the direction of the arrow 53 over the platform 14 in the apparatus, to follow a path 54.

Guide ribs 51 and 52 on the platform control the correct lateral position of the leader.

As the assembly of the leader, the sheet document 46 and the envelope 47 is advanced between the heating plates, the temperature of the assembly gradually rises, and so does the pressure which is exerted on it by the converging heating plates. This has for effect that entrapped air in the assembly is smoothly and progressively squeezed out in the direction of the trailing end of the assembly. The maximum pressure is obtained at the outlet edge of the plates.

As the assembly reaches the outlet rollers 16, 17 the heat-sealable layers of the envelope 47 have been weakened to such an extent that the high specific pressure in the nip of the rollers causes the integral welding of the covering envelope to the enclosed sheet document, and of the peripheral margins of the envelope extending beyond the document, to each other.

The sealed assembly is then advanced between the plates 44 and 45 which exert a moderate pressure on the laminated product and which keep the different members in good contact during the cooling down of the molten heat-sealing layers. Thereafter, the leader 49 may be removed from the sealed sheet document which is now ready for use.

The following data illustrate one embodiment of the apparatus according to the invention.

Max. sealing width (distance between the guides 51, 52): 85 mm
Transport speed: a range from 0.5 to 1.5 cm.s$^{-1}$
Contact area of each heating plate: 18 × 55 mm
Thickness of each heating plate: 8 mm
Resistive electrical heaters, each: 120 W
Pressure of each spring 30 and 32: 3.9N
Pressure of each spring 31 and 33 in the rest position of the upper heating plate (FIG. 3): 14.5N
Thickness of spacers 28 and 29: 3.00 mm
Thickness of leader 49 (position A in FIG. 4): 0.60 mm Thickness of leader 49 with enclosed sheet document 46 and envelope 47 (position B in FIG. 4): 1.43 mm It will be understood that the apparatus will comprise in practice still other expedients that are not illustrated in the drawings, but that are known in the art. We refer to a temperature control for the heating plates, a flexible mounting and a springlike biasing of one roller of each roller pair so that the passage of the sheet between the rollers causes a displacement of one roller pair whereby the pressure in the roller nip is much better under control than with bodily fixed mounted rollers, etc.

The invention is not limited to the embodiment described hereinbefore.

The spring-biasing of the outlet end of the plates may be obtained or enhanced by the use of clip-like wire springs that fit over both plates, at marginal zones out of the path of the sheets through the apparatus. One embodiment of such wire springs has been illustrated in broken lines as 56 and 57 in FIGS. 1 and 2.

The four-point mounting of the upper heating plate 24 may be replaced by a two-point mounting, with two screws with corresponding compression springs that may take the approximate positions C and D illustrated in FIG. 2. The effect of such asymmetric mounting of the springs is that the bias on the upper heating plate is larger at the outlet than at the inlet end.

The heating of the plates 24 and 25 may occur by other means, such as by electrical heaters embedded in the plates, by IR-radiation, etc. The heating may be limited to one plate only in case the original document is to be covered on one side only by a heat-sealable protective film.

The spacers 28 and 29 may be replaced by striplike spacers such as the spacers 60 and 61 illustrated in broken lines that extend over almost the complete length of the sheet path between the plates. Such spacers may have a wedge-like form, thereby to provide a larger spacing at the entry than at the outlet end of the plates.

The spacers 28 and 29 may be omitted in those cases where the friction coefficient of the leader versus the plates, and/or the contact pressure of the leader with the plates is such that no difficulties may arise with the entry of the leader or the assembly, or with the advance thereof, between the plates.

We claim:

1. In an apparatus for heat-laminating sheet material to a plastic film which comprises an opposed pair of inlet rollers defining a nip for conveying in one direction along a generally straight path a sandwich of sheet material and a plastic film on at least one surface of said material, a pair of generally rectangular rigid pressure plates, one on each side of said path, downstream of said inlet rollers for receiving therebetween the sandwich conveyed by said inlet rollers, said plates having substantially planar surfaces on the sides thereon facing said path, means for biasing said plates towards each other to bring said planar surface into pressure contact with the opposite faces of said sandwich passing therebetween, means for heating at least one of said pressure plates, a pair of outlet rollers defining a nip on said path downstream of said pressure plates for receiving and welding by pressure the heated sheet material and plastic film of said sandwich emerging from between said pressure plates and for withdrawing the thus-laminated sandwich from said plates, and means for rotating the roller pairs, in combination, the improvement wherein said biasing means are differential biasing means applying to the end of said pressure plates adjacent said outlet rollers a force which is greater than at the opposite end thereof and is at a substantially uniform level transversely of said path at each loci along the length of the pressure plates, whereby the sandwich is subjected to gradually increasing pressure in passing between said plates.

2. The apparatus of claim 1 including separate compression spring means at the opposite ends of said pressure plates, the compressive force of the spring means at the upstream end of said plates being significantly greater than that of the spring means at the downstream end of said plates.

3. The apparatus of claim 1 wherein said sandwich is provided at one end thereof with a leader strip and including spacer means disposed between the plates at their upstream end to create at such end a gap between the plates which has a thickness greater than the thickness of said leader to facilitate feeding of the sandwich through the apparatus.

4. The apparatus of claim 1 wherein both of said pressure plates are heated.

5. The apparatus of claim 1 wherein the upstream ends of the pressure plates are flared outwardly away from said path to define a mouth for advancing the sandwich therebetween.

* * * * *

UNITED STATES PATENT AND TRADEMARK OFFICE
CERTIFICATE OF CORRECTION

PATENT NO. : 5,158,641

DATED : October 27, 1992

INVENTOR(S) : LEON L. VERMEULEN ET AL

It is certified that error appears in the above-identified patent and that said Letters Patent is hereby corrected as shown below:

col. 8, line 32, change "greater" to --smaller--.

Signed and Sealed this

Twenty-third Day of November, 1993

Attest:

BRUCE LEHMAN

Attesting Officer     Commissioner of Patents and Trademarks